US012786328B2

(12) United States Patent
Fukayama

(10) Patent No.: US 12,786,328 B2
(45) Date of Patent: Nov. 3, 2026

(54) MEDIUM CONVEYANCE DEVICE, IMAGE READING DEVICE, AND PRINTING APPARATUS

(71) Applicant: SEIKO EPSON CORPORATION, Tokyo (JP)

(72) Inventor: Tatsuya Fukayama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/185,318

(22) Filed: Apr. 22, 2025

(65) Prior Publication Data

US 2025/0330543 A1 Oct. 23, 2025

(30) Foreign Application Priority Data

Apr. 22, 2024 (JP) ................................ 2024-069206

(51) Int. Cl.
*B65H 3/06* (2006.01)
*B41J 3/44* (2006.01)
*H04N 1/00* (2006.01)

(52) U.S. Cl.
CPC ............ *H04N 1/00602* (2013.01); *B41J 3/44* (2013.01)

(58) Field of Classification Search
CPC .......... H04N 1/00602; B41J 3/44; B65H 3/06
See application file for complete search history.

(56) References Cited

U.S. PATENT DOCUMENTS 9,535,389 B2 * 1/2017 Muramatsu ........ G03G 15/6511

FOREIGN PATENT DOCUMENTS

JP 2003192161 A * 7/2003
JP 2007178518 A 7/2007

OTHER PUBLICATIONS

Machine translation of JP2003-192161. (Year: 2003).*

* cited by examiner

*Primary Examiner* — Thomas A Morrison
(74) *Attorney, Agent, or Firm* — CHIP LAW GROUP

(57) ABSTRACT

There is provided a medium conveyance device which includes a rotating body that rotates in contact with a medium, a conductive rotating shaft to which the rotating body is attached, the conductive rotating shaft rotating the rotating body, a bearing which rotatably holds the rotating shaft, a conductive contact section provided between the rotating body and the bearing in an axial direction of the rotating shaft and capable of coming into contact with the rotating shaft, and a grounding member which grounds the contact section.

19 Claims, 8 Drawing Sheets

MEDIUM CONVEYANCE DEVICE, IMAGE READING DEVICE, AND PRINTING APPARATUS

The present application is based on, and claims priority from JP Application Serial Number 2024-069206, filed Apr. 22, 2024, the disclosure of which is hereby incorporated by reference herein in its entirety.

BACKGROUND

1. Technical Field

The present disclosure relates to a medium conveyance device, an image reading device, and a printing apparatus.

2. Related Art

For example, as disclosed in JP-A-2007-178518, there is an automatic paper feeding device that is an example of a medium conveyance device. The automatic paper feeding device includes a rotating roller that is an example of a rotating body and a metal rotating shaft that is an example of a rotating shaft. The metal rotating shaft is a shaft of the rotating roller. The rotating roller conveys, for example, a document that is an example of a medium. When the rotating roller rotates, static electricity is sometimes caused by friction. For that reason, in the automatic paper feeding device, the metal rotating shaft is grounded via a conductive bearing, a metal elastic material, and a metal side plate.

JP-A-2007-178518 is an example of the related art.

In JP-A-2007-178518, the metal elastic material is sandwiched between the conductive bearing and the metal side plate. The conductive bearing ensures conduction by bringing the metal elastic material and the metal side plate into surface contact with each other. For that reason, design restrictions are likely to occur.

SUMMARY

According to an aspect of the present disclosure, there is provided a medium conveyance device including: a rotating body configured to rotate in contact with a medium; a conductive rotating shaft to which the rotating body is attached, the conductive rotating shaft rotating the rotating body; a bearing configured to rotatably hold the rotating shaft; a conductive contact section provided between the rotating body and the bearing in an axial direction of the rotating shaft and capable of coming into contact with the rotating shaft; and a grounding member configured to ground the contact section.

According to an aspect of the disclosure, there is provided an image reading device including: a medium conveyance device including: a rotating body configured to rotate in contact with a medium; a conductive rotating shaft to which the rotating body is attached, the conductive rotating shaft rotating the rotating body; a bearing configured to rotatably hold the rotating shaft; a conductive contact section provided between the rotating body and the bearing in an axial direction of the rotating shaft and capable of coming into contact with the rotating shaft; and a grounding member configured to ground the contact section; and a reading unit configured to read an image of the medium conveyed by the medium conveyance device.

According to an aspect of the present disclosure, there is provided a printing apparatus including: the image reading device having the configuration explained above; and a printing unit configured to print the image read by the image reading device.

DESCRIPTION OF EMBODIMENTS

Embodiment

Figure 1:
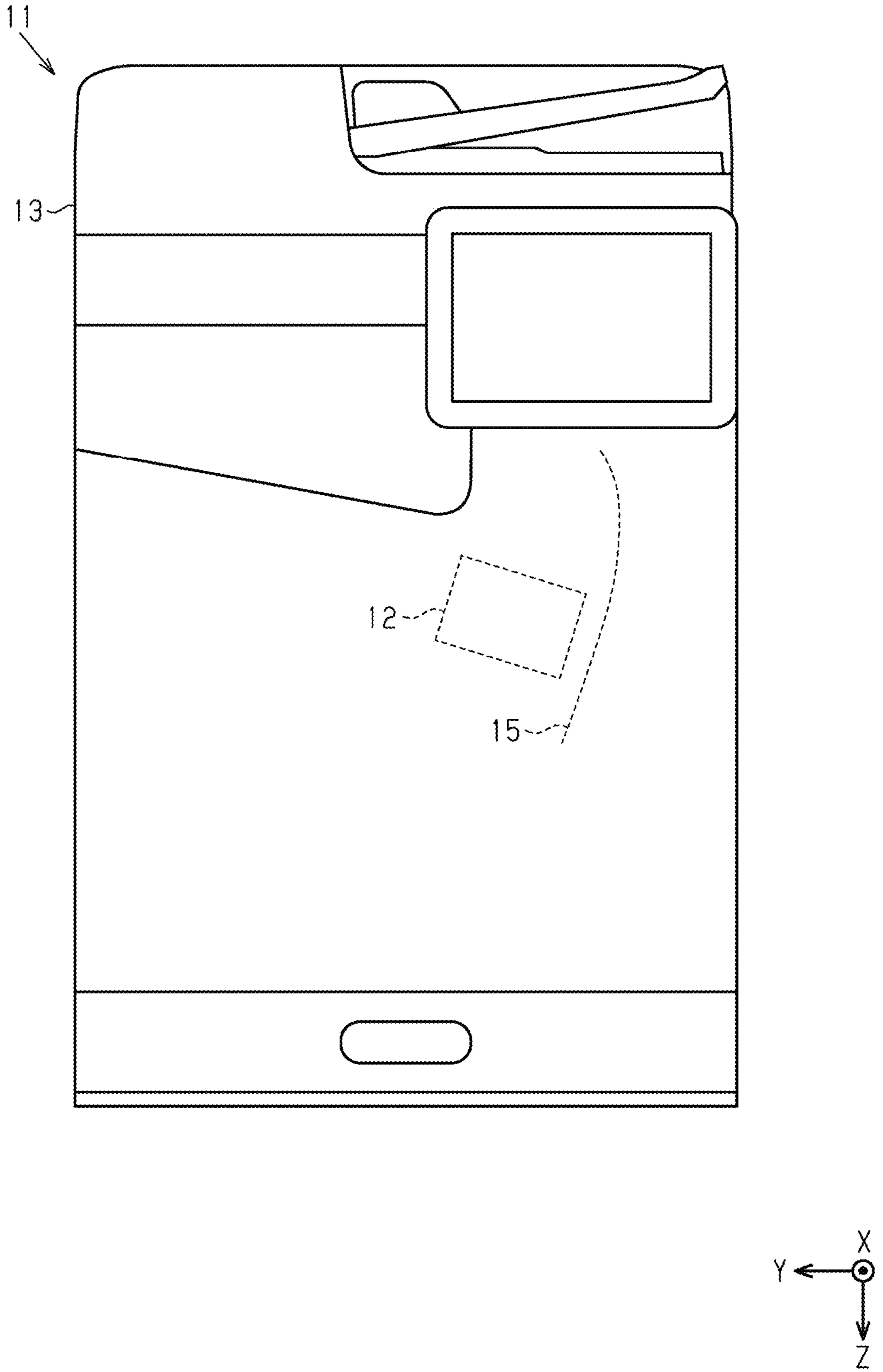
FIG. 1 is a schematic diagram of a printing apparatus according to an embodiment.

A medium conveyance device, an image reading device, and a printing apparatus according to an embodiment are explained below with reference to the drawings. The image reading device is, for example, a sheet feed scanner in which a fixed reading unit reads an image of a conveyed medium such as paper or a film. The printing apparatus is, for example, an inkjet printer that discharges ink, which is an example of liquid, onto a medium such as paper, fabric, vinyl, a plastic component, or a metal component to perform printing.

In the drawings, assuming that a printing apparatus 11 is placed on a horizontal plane, a direction of gravity is indicated by a Z axis and directions along the horizontal plane are indicated by an X axis and a Y axis. The X axis, the Y axis, and the Z axis are orthogonal to one another. In the following description, a direction parallel to the X axis is also referred to as a width direction X.

Printing Apparatus

As illustrated in FIG. 1, the printing apparatus 11 includes a printing unit 12 and an image reading device 13.

The printing unit 12 is capable of printing an image read by the image reading device 13. The printing unit 12 may discharge liquid from not-illustrated one or more nozzles and perform printing on a medium 15.

Image Reading Device

Figure 2:
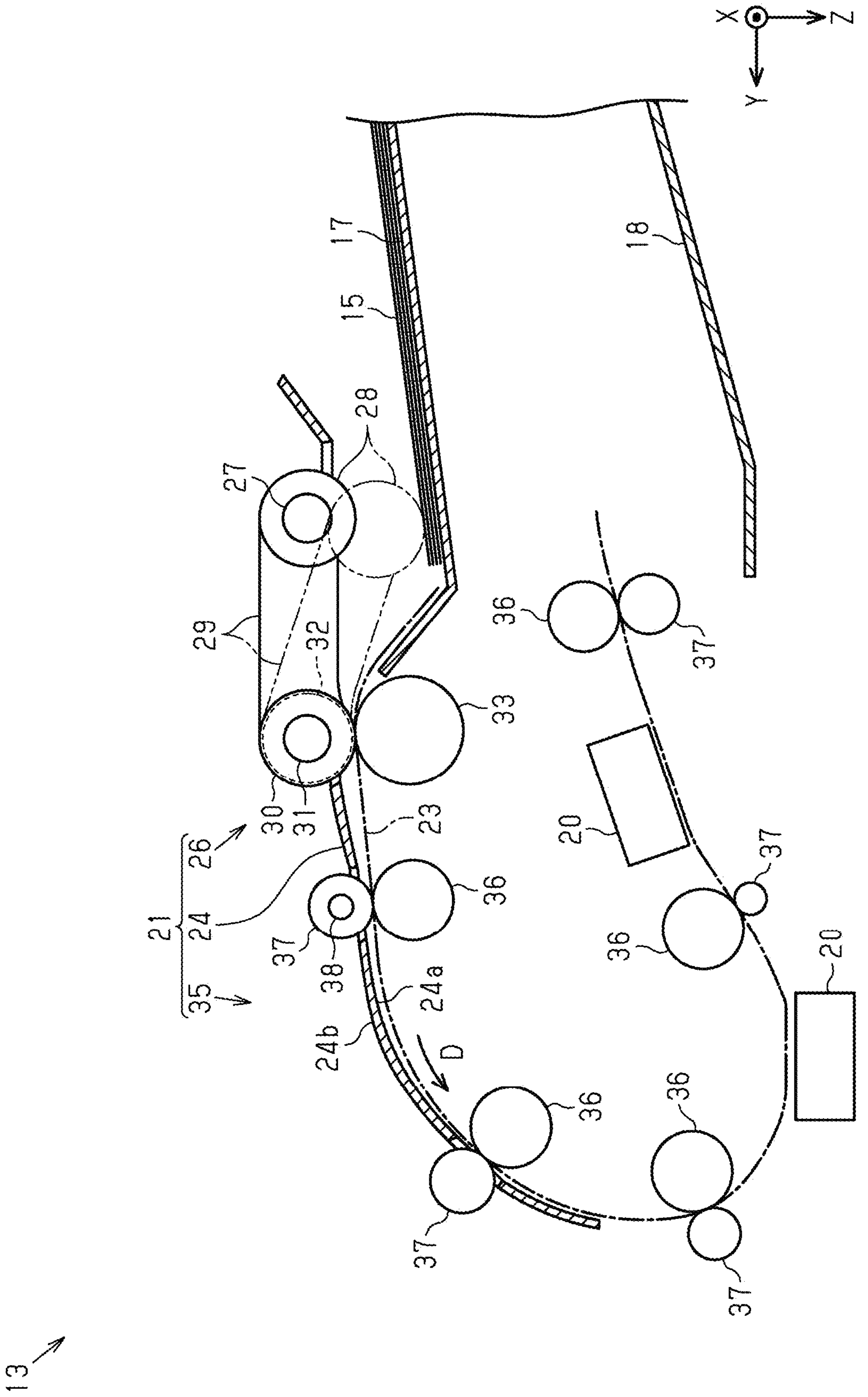
FIG. 2 is a schematic side view of a medium conveyance device in which a path forming section is located at a closed position.

As illustrated in FIG. 2, the image reading device 13 reads an image of the medium 15. The medium 15 read by the image reading device 13 may be the medium 15 printed by the printing unit 12 or may be a document, a photograph, or the like.

The image reading device 13 may include a feeding tray 17. The medium 15 before reading can be set on the feeding tray 17. A plurality of media 15 can be placed on the feeding tray 17 in a stacked state.

The image reading device 13 may include a discharge tray 18. The discharge tray 18 receives the medium 15 after reading. The plurality of media 15 can be stacked on the discharge tray 18.

The image reading device 13 includes a reading unit 20 and a medium conveyance device 21. The image reading device 13 may include a plurality of reading units 20. The reading unit 20 is capable of reading an image of the medium 15 conveyed by the medium conveyance device 21. The reading unit 20 is provided along a conveyance path 23 for the medium 15. In the drawing, the conveyance path 23 is indicated by an alternate long and short dash line. The plurality of reading units 20 may respectively read images of different surfaces of the medium 15. For example, one reading unit 20 is capable of reading an image on the surface of the medium 15. The other reading unit 20 is capable of reading an image on the rear surface of the medium 15. The reading unit 20 may include, for example, a contact optical sensor. The reading unit 20 may include, for example, a reduction optical sensor.

Medium Conveyance Device

The medium conveyance device 21 conveys the medium 15 in a conveyance direction D along the conveyance path 23. The conveyance path 23 is, for example, a path connecting the feeding tray 17 and the discharge tray 18. The medium conveyance device 21 feeds the medium 15 set in the feeding tray 17 to the discharge tray 18. The medium conveyance device 21 may separate the plurality of media 15 set in the feeding tray 17 one by one and convey the media 15 in order. The medium conveyance device 21 may discharge the conveyed medium 15 to the discharge tray 18.

The medium conveyance device 21 may include a path forming section 24. The path forming section 24 is non-conductive. The path forming section 24 forms the conveyance path 23 on which the medium 15 is conveyed. The path forming section 24 include a path surface 24*a* and a rear surface 24*b*. The path surface 24*a* forms the conveyance path 23. The path surface 24*a* is a surface with which the medium 15 conveyed on the conveyance path 23 comes into contact or that faces the medium 15. The rear surface 24*b* is a surface opposite to the path surface 24*a*. The rear surface 24*b* in the present embodiment is an upper surface.

Figure 3:
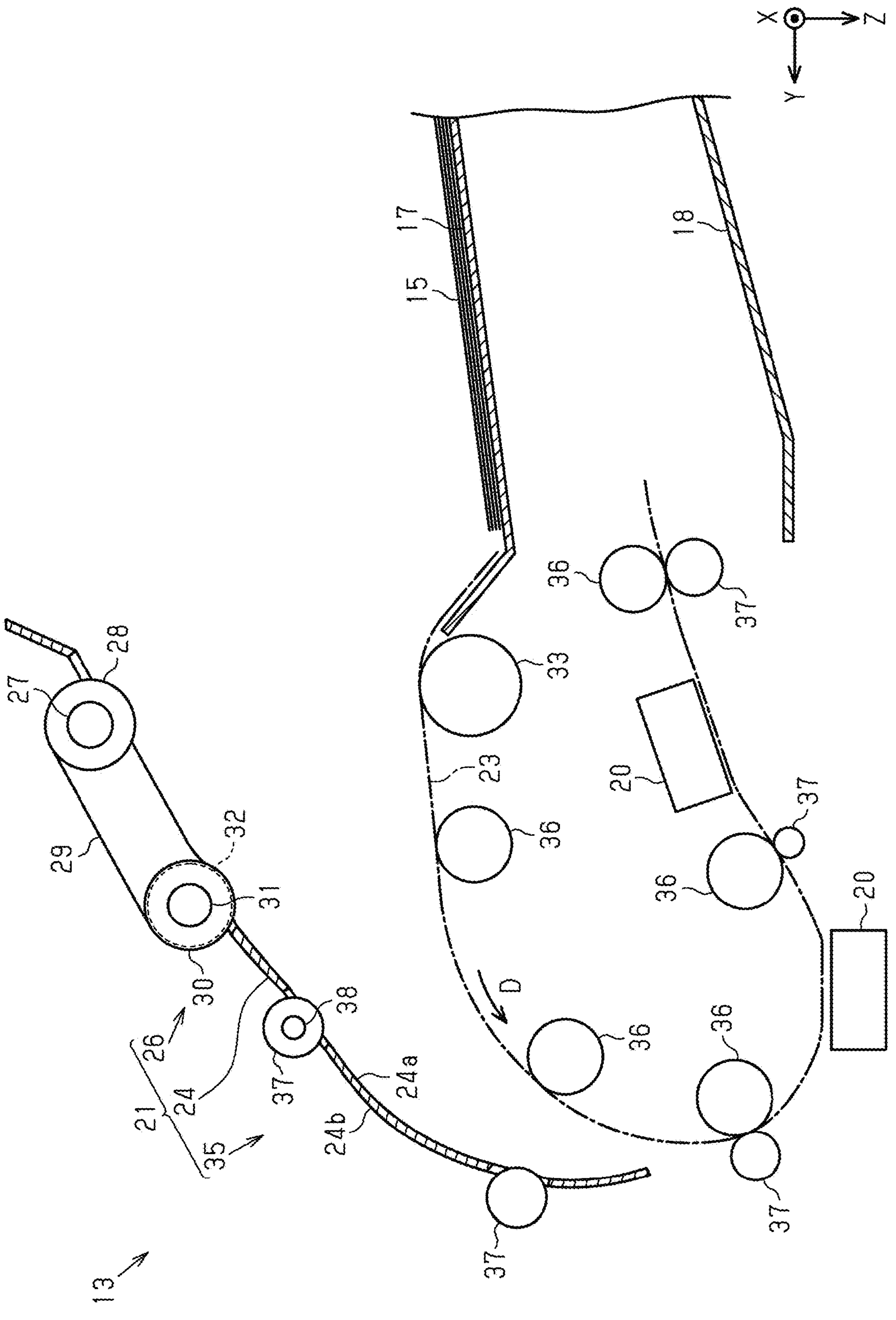
FIG. 3 is a schematic side view of the medium conveyance device in which the path forming section is located at an open position.

As illustrated in FIGS. 2 and 3, the path forming section 24 is movable to a closed position illustrated in FIG. 2 and an open position illustrated in FIG. 3. The path forming section 24 located at the closed position forms the conveyance path 23. The path forming section 24 located at the open position exposes the path surface 24*a*.

The medium conveyance device 21 may include a feeding unit 26. The feeding unit 26 feeds, for example, the medium 15 located at the top among the media 15 set in the feeding tray 17 to the conveyance path 23. The feeding unit 26 may include a feeding shaft 27, a feeding roller 28, a frame body 29, a rotating body 30, a rotating shaft 31, a driving gear 32, and a retard roller 33.

The feeding shaft 27 may rotatably support the feeding roller 28. The feeding shaft 27 may rotate the feeding roller 28. The feeding shaft 27 is supported by the frame body 29. The feeding shaft 27 extends in the width direction X. The feeding shaft 27 is provided in parallel to the rotating shaft 31.

The feeding roller 28 is supported by the frame body 29 via the feeding shaft 27. The feeding roller 28 rotates centering on the feeding shaft 27. The feeding roller 28 may be provided at the center in the width direction X in the conveyance path 23.

The frame body 29 is capable of rotating centering on the rotating shaft 31. The frame body 29 reciprocates the feeding roller 28 between a separation position indicated by a solid line in FIG. 2 and a feeding position indicated by an alternate long and two short dashes line in FIG. 2.

The separation position is a position where the feeding roller 28 is separated from the medium 15 set in the feeding tray 17.

The feeding position is a position where the feeding roller 28 is brought into contact with the medium 15 set in the feeding tray 17. The feeding roller 28 moving from the separation position to the feeding position comes into contact with the medium 15 set in the feeding tray 17 from above. When there is no medium 15 set in the feeding tray 17, the feeding roller 28 may come into contact with the feeding tray 17. The feeding roller 28 rotates at the feeding position to thereby feed the medium 15 from the feeding tray 17 to the conveyance path 23.

The rotating shaft 31 is conductive. The rotating shaft 31 extends in the width direction X. That is, an axial direction of the rotating shaft 31 is the width direction X. The rotating body 30 is attached to the rotating shaft 31. The driving gear 32 is attached to the rotating shaft 31. The rotating body 30 and the driving gear 32 may be located at both ends of the rotating shaft 31 in the axial direction of the rotating shaft 31. The rotating body 30 may be located at a first end 31*f* illustrated in FIG. 4. The driving gear 32 may be located at a second end 31*s* illustrated in FIG. 4. When a driving force is input to the driving gear 32, the rotating shaft 31 rotates together with the driving gear 32. The rotating shaft 31 rotates the rotating body 30.

The rotating body 30 is located downstream of the feeding roller 28 in the conveyance direction D. The rotating body 30 sandwiches the medium 15 fed by the feeding roller 28 between the rotating body 30 and the retard roller 33. The rotating body 30 rotates in a direction in which the medium 15 is fed in the conveyance direction D. Specifically, the rotating body 30 rotates in a clockwise direction in FIG. 2. The rotating body 30 rotates in contact with the medium 15.

The rotating body 30 and the retard roller 33 are configured to separate the media 15 one by one. That is, the rotating body 30 in the present embodiment is a separation roller that separates a stacked plurality of media 15.

The retard roller 33 may be capable of rotating in a forward rotation direction and a reverse rotation direction. The forward rotation direction is a direction in which the medium 15 is returned to the feeding tray 17. The forward rotation direction is the clockwise direction in FIG. 2. A not-illustrated drive source rotates the retard roller 33 in the forward rotation direction. The reverse rotation direction is a direction opposite to the forward rotation direction.

When the rotating body 30 and the retard roller 33 sandwich the plurality of media 15 therebetween, the first medium 15 located at the top is fed in the conveyance direction D by the rotating body 30. At this time, the second and subsequent media 15 are returned in a direction opposite to the conveyance direction D by the retard roller 33. For that reason, the feeding unit 26 can feed the media 15 one by one.

A torque limiter may be provided in the retard roller 33. The torque limiter may block transmission of a driving force when the retard roller 33 receives a predetermined force in the reverse rotation direction. For example, when the rotating body 30 and the retard roller 33 sandwich one medium 15, the medium 15 is conveyed in the conveyance direction D by the rotating body 30. The retard roller 33 comes into contact with the medium 15 conveyed in the conveyance direction D. That is, the retard roller 33 receives a force in the reverse rotation direction from the medium 15. Therefore, the transmission of the driving force to the retard roller 33 is blocked by the torque limiter. The retard roller 33 may rotate following the medium 15 conveyed in the conveyance direction D.

The medium conveyance device 21 may include a conveyance unit 35. The conveyance unit 35 conveys, along the conveyance path 23, the medium 15 fed by the feeding unit 26. The conveyance unit 35 discharges the medium 15 to the discharge tray 18. The conveyance unit 35 may include a conveyance roller 36, a driven rotating body 37, and a support shaft 38. The conveyance unit 35 may include a plurality of conveyance rollers 36, a plurality of driven rotating bodies 37, and a plurality of support shafts 38.

The conveyance roller 36 conveys the medium 15 by rotating in a state in which the medium 15 is sandwiched between the conveyance roller 36 and the driven rotating body 37. The driven rotating body 37 rotates following the conveyed medium 15.

The support shaft 38 extends in the width direction X. One support shaft 38 may support the plurality of driven rotating bodies 37 provided at intervals in the width direction X. The support shaft 38 rotatably supports the driven rotating body 37. The support shaft 38 is conductive. The support shaft 38 may be supported by the path forming section 24. The support shaft 38 is located on the rear surface 24*b* side with respect to the path forming section 24.

The rotating shaft 31 and the support shaft 38 may move together with the path forming section 24. For example, when the medium 15 is jammed in the conveyance path 23, a user can easily remove the medium 15 by moving the path forming section 24 to the open position illustrated in FIG. 3. The user may replace the rotating body 30 by positioning the path forming section 24 at the open position. The user may detach the frame body 29 and the rotating body 30 from the first end 31*f* side by moving the frame body 29 and the rotating body 30 in a direction opposite to the driving gear 32. The user may replace the feeding roller 28 or the rotating body 30.

Figure 4:
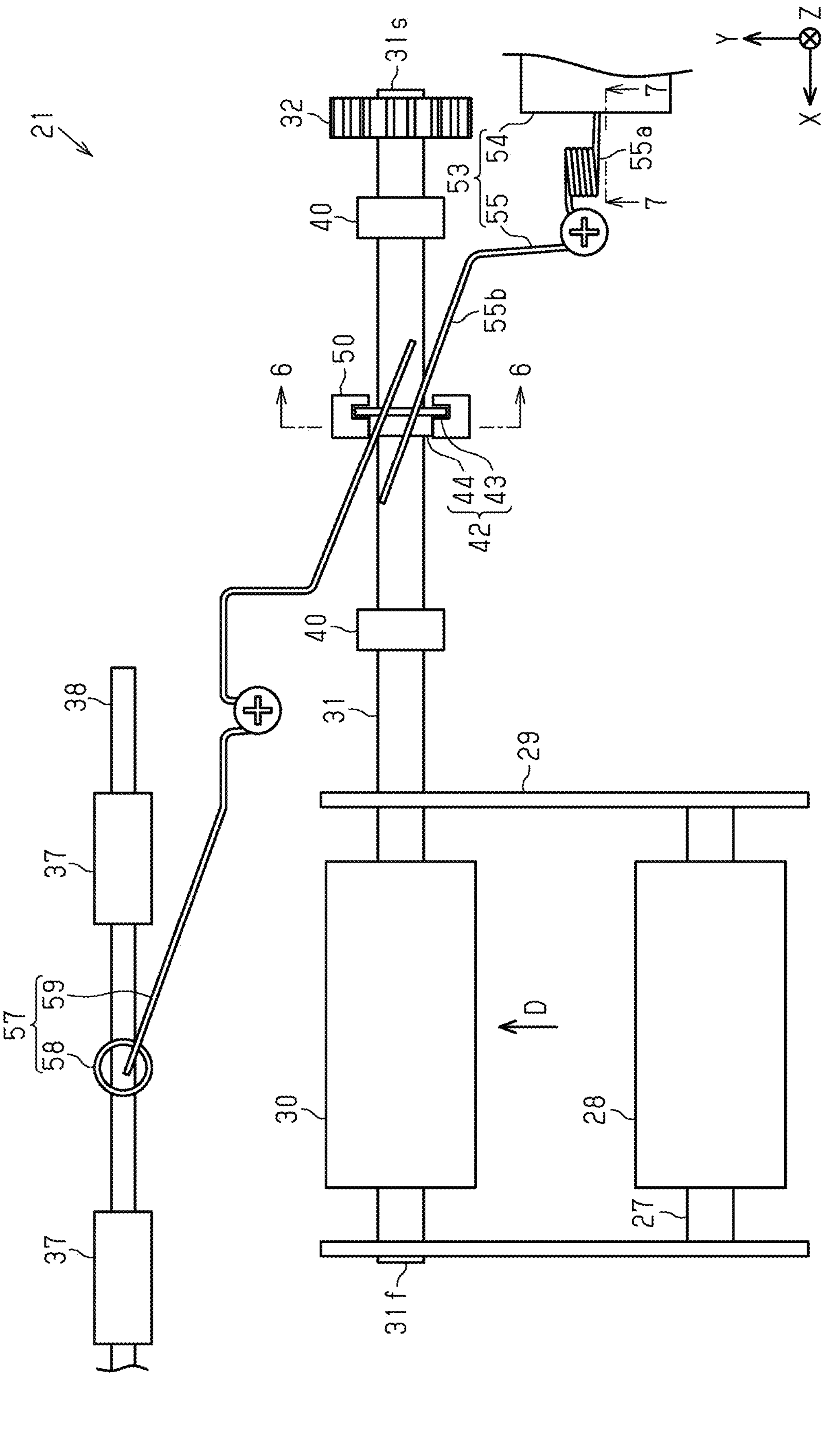
FIG. 4 is a schematic plan view of the medium conveyance device.
Figure 5:
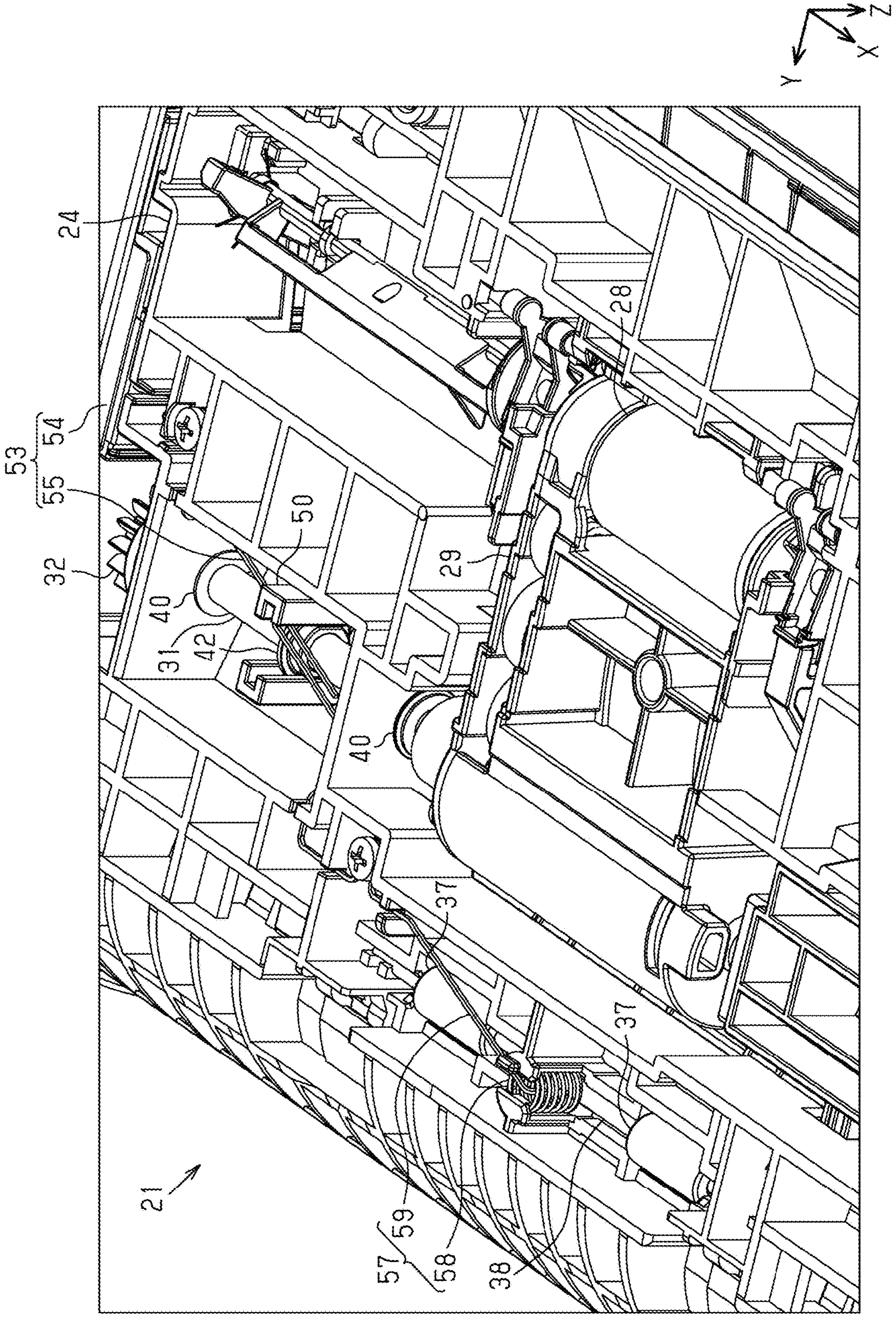
FIG. 5 is a perspective view of the medium conveyance device.

As illustrated in FIGS. 4 and 5, the medium conveyance device 21 includes a bearing 40. The medium conveyance device 21 may include a plurality of bearings 40. The plurality of bearings 40 are provided at intervals in the width direction X. The bearing 40 is located between the rotating body 30 and the driving gear 32. The bearing 40 may be provided in the path forming section 24. For example, the bearing 40 is provided on the rear surface 24*b* of the path forming section 24. The bearing 40 rotatably holds the rotating shaft 31.

The medium conveyance device 21 includes a contact section 42. The contact section 42 is provided between the rotating body 30 and the bearing 40 in the axial direction of the rotating shaft 31. When the medium conveyance device 21 includes the plurality of bearings 40, the contact section 42 is located between the bearing 40 located at a position most distant from the rotating body 30 and the rotating body 30. For that reason, it can also be said that the rotating body 30 is attachable to and detachable from the rotating shaft 31 from a side opposite to the contact section 42. The contact section 42 is conductive. The contact section 42 is capable of coming into contact with the rotating shaft 31.

Figure 6:
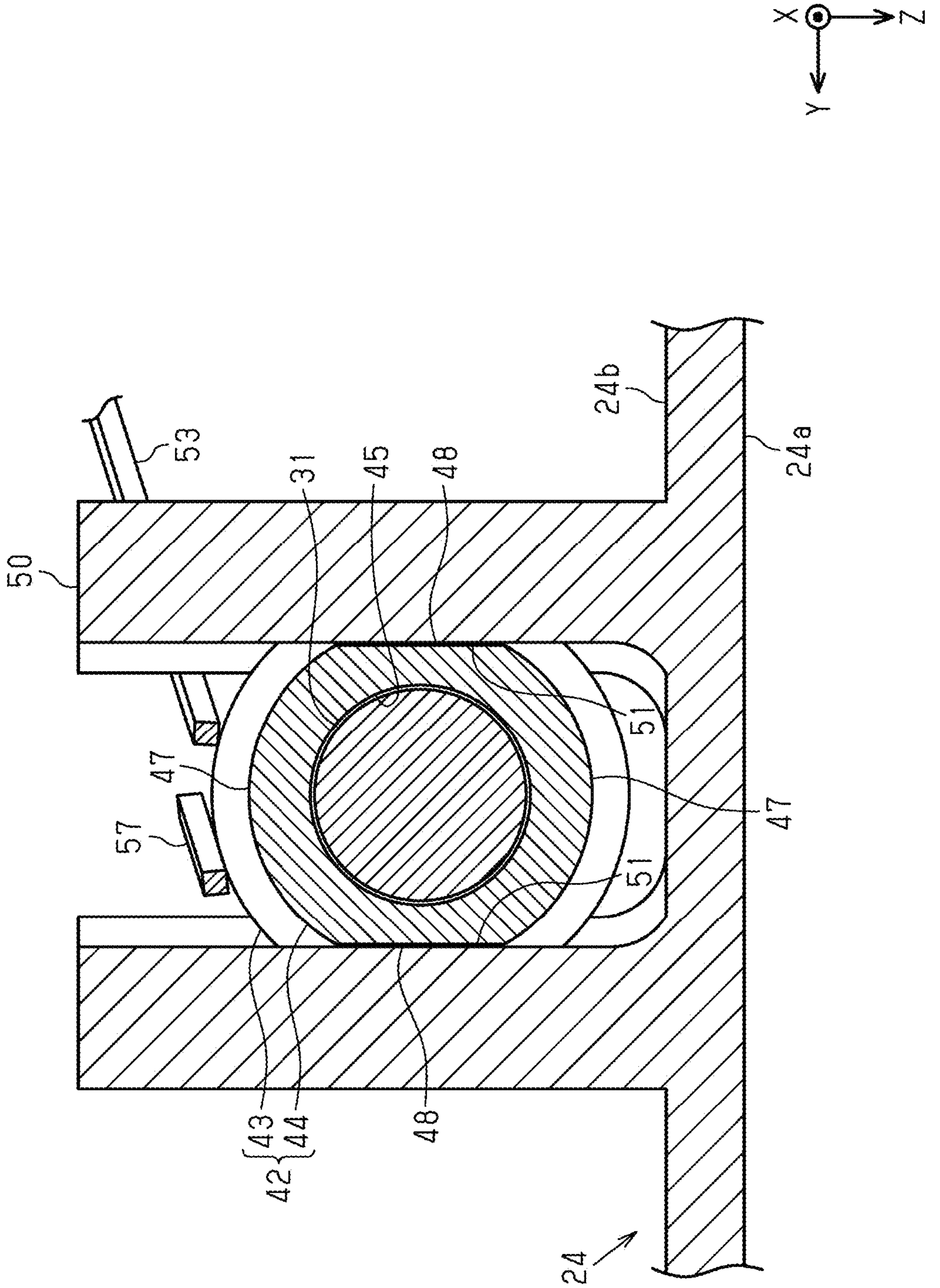
FIG. 6 is a 6-6 line arrow cross-sectional view in FIG. 4.

As illustrated in FIG. 6, the contact section 42 is provided on a side opposite to the path surface 24*a* with respect to the path forming section 24. The contact section 42 is provided on the rear surface 24*b* side with respect to the path forming section 24.

The contact section 42 includes a flange section 43 and a ring section 44. A hole 45 is formed in the contact section 42. The hole 45 penetrates the ring section 44. That is, the hole 45 is formed in the ring section 44. The hole 45 may be circular. The diameter of the hole 45 is larger than the diameter of the rotating shaft 31. The rotating shaft 31 can be inserted through the hole 45. For that reason, it can be said that the hole 45 penetrates in the axial direction of the rotating shaft 31. The hole 45 has play with respect to the rotating shaft 31. The rotating shaft 31 is capable of rotating to slide with respect to the contact section 42. The contact section 42 may be a metal body or may be a sintered body. For example, when an oil-impregnated sintered bearing in which a sintered body is impregnated with lubricating oil is used in the contact section 42, friction between the rotating shaft 31 and the contact section 42 can be reduced. Further, when an oil-impregnated sintered bearing is used for the contact section 42, friction between the contact section 42 and a grounding member 53 described later can be reduced.

The flange section 43 protrudes from the ring section 44 in the radial direction of the hole 45. The diameter of the flange section 43 is larger than the diameter of the ring section 44. The flange section 43 projects from the ring section 44.

The outer circumferential surface of the ring section 44 may include a columnar surface 47 and a plane 48. The outer circumferential surface may include a plurality of columnar surfaces 47 and a plurality of planes 48. Two planes 48 provided in the present embodiment are parallel to each other. The columnar surface 47 is, for example, a curved surface that is concentric with the hole 45 and includes an arc. The plane 48 is, for example, a plane that is concentric with the hole 45 and includes a chord.

The path forming section 24 may include a holding section 50. The holding section 50 holds the contact section 42. The holding section 50 holds the flange section 43. For that reason, the holding section 50 restricts movement of the contact section 42 in the axial direction of the rotating shaft 31. The holding section 50 may include a stopper 51 that comes into contact with the plane 48. The holding section 50 may include stoppers 51 as many as the planes 48. The stopper 51 may restrict displacement of the contact section 42 in a direction intersecting the plane 48 and allow displacement of the contact section 42 parallel to the plane 48. That is, the holding section 50 may hold the contact section 42 to be incapable of rotating. The holding section 50 may hold the contact section 42 to be displaceable in a direction along the plane 48. The holding section 50 in the present embodiment holds the contact section 42 to be displaceable in the vertical direction.

As illustrated in FIGS. 4 and 5, the medium conveyance device 21 includes the grounding member 53. The grounding member 53 grounds the contact section 42. The grounding member 53 grounds the contact section 42 in a state in which the path forming section 24 is located at the closed position. The grounding member 53 may include a fixed section 54 and a movable section 55.

The fixed section 54 in the present embodiment is formed of a sheet metal. In the medium conveyance device 21, the fixed section 54 may be directly grounded or a grounded member may be conducted to the fixed section 54. The grounded member may be provided in the image reading device 13 or may be provided in the printing apparatus 11. The fixed section 54 may be fixed to a main body of the medium conveyance device 21. The fixed section 54 is provided separately from the path forming section 24. Even if the path forming section 24 moves, the fixed section 54 does not move.

The movable section 55 in the present embodiment is formed of a wire. The movable section 55 may have elasticity. That is, the grounding member 53 may have elasticity. The movable section 55 may include a torsion spring section 55*a* and a cantilever spring section 55*b*. The movable section 55 is attached to the path forming section 24. The movable section 55 is movable together with the path forming section 24.

Figure 7:
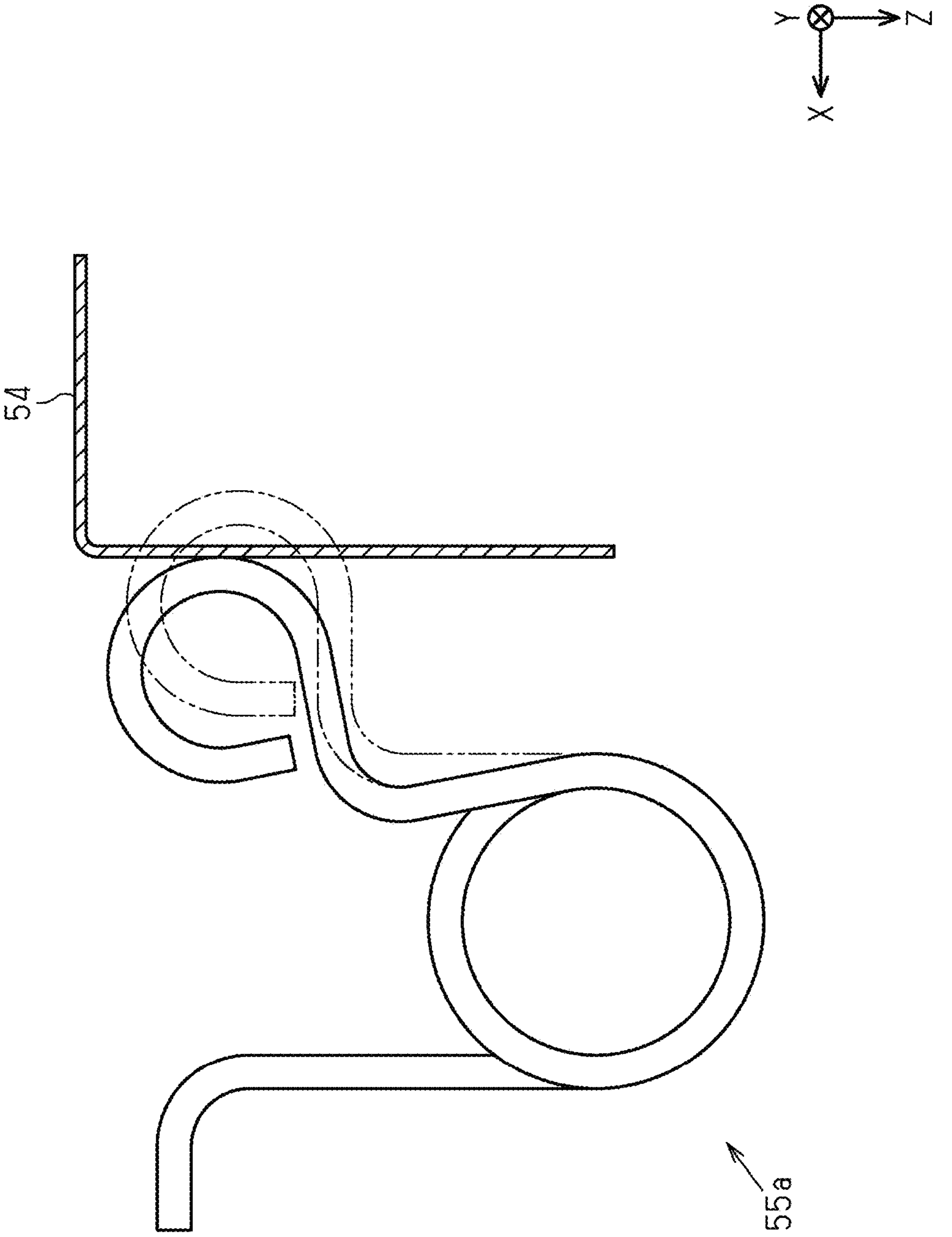
FIG. 7 is a 7-7 line arrow cross-sectional view in FIG. 4.

As illustrated in FIG. 7, the torsion spring section 55*a* of the movable section 55 may be in contact with the fixed section 54. The torsion spring section 55*a* comes into contact with the fixed section 54 when the path forming section 24 is located at the closed position. The torsion spring section 55*a* is elastically deformed from a shape of an alternate long and two short dashes line to a shape of a solid line by moving from the open position to the closed position. By bringing the torsion spring section 55*a* into contact with the fixed section 54 in an elastically deformed state, the movable section 55 and the fixed section 54 can be stably conducted.

As illustrated in FIGS. 4 and 5, an end of the cantilever spring section 55*b* on a side opposite to the torsion spring section 55*a* comes into contact with the contact section 42. The cantilever spring section 55*b* may be placed on the flange section 43. The cantilever spring section 55*b* presses the flange section 43 downward. That is, the grounding member 53 urges the contact section 42 downward. The grounding member 53 may urge the contact section 42 toward the rotating shaft 31.

The medium conveyance device 21 may include a conductive member 57. The conductive member 57 has conductivity. The conductive member 57 conducts the support shaft 38 and the contact section 42. The conductive member 57 may include a coil spring 58 and a wire 59.

The coil spring 58 comes into contact with the support shaft 38. The coil spring 58 may press the driven rotating body 37 against the conveyance roller 36 by pressing the support shaft 38.

The wire 59 may press the coil spring 58 from a side opposite to the support shaft 38. The wire 59 comes into contact with the coil spring 58. That is, the support shaft 38, the coil spring 58, and the wire 59 are electrically coupled to one another. An end of the wire 59 on a side opposite to an end in contact with the coil spring 58 may come into contact with the contact section 42. The wire 59 is placed on the flange section 43. The wire 59 presses the flange section 43 downward. The conductive member 57 may urge the contact section 42 in the same direction as the grounding member 53. The conductive member 57 may urge the contact section 42 toward the rotating shaft 31.

The direction in which the grounding member 53 and the conductive member 57 urge the contact section 42 may coincide with a direction in which the holding section 50 allows displacement of the contact section 42. In other words, the holding section 50 holds the contact section 42 to be displaceable in the urging direction in which the grounding member 53 urges the contact section 42.

The holding section 50 may hold the grounding member 53. The holding section 50 may hold the conductive member 57. The holding section 50 may restrict movement of the grounding member 53 and the conductive member 57. The distal end of the holding section 50 may be located above the upper end of the flange section 43. The distal end of the holding section 50 may be located above a position where the grounding member 53 and the conductive member 57 are in contact with the contact section 42. The holding section 50 may extend further than the grounding member 53 in a direction opposite to the direction in which the grounding member 53 urges the contact section 42. The grounding member 53 and the conductive member 57 may urge the contact section 42 downward at a position below the distal end of the holding section 50.

Action of the Present Embodiment

Action of the present embodiment is explained.

The rotating body 30 is grounded via the rotating shaft 31, the contact section 42, and the grounding member 53. The rotating body 30 is rotatable in a state of being less easily charged.

Effects of the Present Embodiment

Effects of the present embodiment are explained.

(1-1) The contact section 42 is capable of coming into contact with the rotating shaft 31. The contact refers to a state in which one touches the other to come into contact with each other to be conductible. That is, the contact section 42 is electrically coupled to the rotating shaft 31 by touching the rotating shaft 31. The grounding member 53 grounds the contact section 42. By grounding the rotating shaft 31 with the contact section 42 different from the bearing 40, design restrictions can be reduced.

(1-2) For example, when the contact section 42 deviates from the rotating shaft 31, the contact between the contact section 42 and the rotating shaft 31 is likely to be released. In this regard, the hole 45 having the diameter larger than the diameter of the rotating shaft 31 is formed in the contact section 42. That is, the rotating shaft 31 can be inserted into the hole 45 of the contact section 42. Therefore, the contact section 42 and the rotating shaft 31 can be stably brought into contact with each other.

(1-3) The contact section 42 is provided on the side opposite to the path surface 24*a* with respect to the path forming section 24. By effectively utilizing a space formed by providing the path forming section 24, an increase in size of the device can be suppressed.

(1-4) The bearing 40 is provided on the rear surface 24*b* of the path forming section 24. The rear surface 24*b* is a surface on the side opposite to the path surface 24*a*. By effectively utilizing the space formed by providing the path forming section 24, the increase in the size of the device can be suppressed.

(1-5) The contact section 42 includes the ring section 44 and the flange section 43. The diameter of the hole 45 formed in the ring section 44 is larger than the diameter of the rotating shaft 31. For that reason, the contact section 42 becomes capable of moving in the axial direction with respect to the rotating shaft 31 inserted into the hole 45. In this regard, the path forming section 24 includes the holding section 50. The holding section 50 holds the flange section 43. Therefore, the movement of the contact section 42 in the axial direction can be restricted.

(1-6) For example, when the contact section 42 rotates, noise is likely to occur. In this regard, the holding section 50 holds the contact section 42 to be incapable of rotating. For that reason, the occurrence of the noise involved in the rotation of the contact section 42 can be suppressed.

(1-7) For example, when the stopper 51 is brought into contact with the columnar surface 47 to disable the rotation of the contact section 42 with a frictional force, the stopper 51 needs to be pressed against the columnar surface 47 with a large force. In this regard, the stopper 51 comes into contact with the plane 48. For that reason, the contact section 42 can be easily disabled to rotate.

(1-8) The grounding member 53 urges the displaceable contact section 42 toward the rotating shaft 31. For that reason, the grounding member 53 and the contact section 42 and the contact section 42 and the rotating shaft 31 can be stably brought into contact with each other.

(1-9) The holding section 50 extends further in the direction opposite to the urging direction than the grounding member 53. Therefore, it is possible to reduce the likelihood that the contact section 42 urged in the urging direction by the grounding member 53 comes off from the holding section 50.

(1-10) The path forming section 24 is movable. The bearing 40 is provided in the path forming section 24. For that reason, the rotating shaft 31 held by the bearing 40 moves together with the path forming section 24. The structure for grounding the moving rotating shaft 31 cannot be fixed. The grounding member 53 grounds the contact section 42 in a state in which the path forming section 24 forms the conveyance path 23. Therefore, it is possible to reduce the influence of the charged rotating body 30 on the medium 15 on the conveyance path 23.

(1-11) The grounding member 53 urges the contact section 42 toward the rotating shaft 31. That is, the grounding member 53 presses the contact section 42 against the rotating shaft 31. Therefore, the grounding member 53, the contact section 42, and the rotating shaft 31 can be stably brought into contact with one another.

(1-12) For example, when the separation roller deteriorates, the media 15 is likely to be conveyed while being kept stacked. In this regard, the rotating body 30, which is the separation roller, is attachable and detachable from the side opposite to the contact section 42. For that reason, the rotating body 30 can be easily replaced while the contact section 42 is kept in contact with the rotating shaft 31.

(1-13) The conductive member 57 conducts the support shaft 38 and the contact section 42. That is, the driven rotating body 37 is grounded via the support shaft 38, the conductive member 57, the contact section 42, and the grounding member 53. Therefore, structure can be simplified as compared with when a mechanism for grounding the rotating body 30 and a mechanism for grounding the driven rotating body 37 are respectively provided.

(1-14) For example, when the rotating shaft 31 is grounded by the bearing 40 provided at the end of the rotating shaft 31, the medium conveyance device 21 is increased in size in the axial direction by size of the bearing 40. For example, when the rotating shaft 31 is grounded via an elastic material such as a leaf spring and the bearing 40, a space for providing the elastic material and the bearing 40 is required. In this regard, since the rotating shaft 31 is grounded by the contact section 42 provided between the rotating body 30 and the bearing 40 in the axial direction, it is possible to suppress an increase in size of the medium conveyance device 21.

(1-15) For example, when the bearing 40 is directly grounded first, a member that supports the bearing 40 needs to be made of a conductive material such as metal. In this regard, in the medium conveyance device 21, the rotating shaft 31 is grounded by the contact section 42. Therefore, a degree of freedom of the member supporting the bearing 40 can be improved.

(1-16) When the path forming section 24 that supports the bearing 40 is made of a conductive material such as metal, the path forming section 24 increases in weight. For that reason, it is difficult to move the path forming section 24. In this regard, the rotating shaft 31 is grounded via the contact section 42 and the grounding member 53. Therefore, since the path forming section 24 does not need to be made of the conductive material, the path forming section 24 can be reduced in the weight and a degree of freedom in design can be increased based on the weight.

(1-17) For example, when the grounding member 53 is brought into contact with the end surface of the rotating shaft 31, it is necessary to apply grease to the end surface. However, when the path forming section 24 is located at the open position, the end surface of the rotating shaft 31 is exposed to the outside. Therefore, when the grease is applied to the end surface, the user is likely to touch the grease. In this regard, since the contact section 42 is provided between the rotating body 30 and the bearing 40, it is possible to reduce the likelihood that the user touches the grease.

(1-18) The path forming section 24 is non-conductive. For that reason, when the bearing 40 is attached to the path forming section 24, the bearing 40 cannot be grounded first. In this regard, the contact section 42 comes into contact with the rotating shaft 31. For that reason, even when the path forming section 24 is non-conductive, the rotating shaft 31 can be grounded via the contact section 42.

(1-19) One rotating body 30 is provided at the center in the width direction X. For that reason, in the width direction X, a space tends to be formed beside the rotating body 30. In the medium conveyance device 21, the contact section 42 and the grounding member 53 are provided in the space beside the rotating body 30. Therefore, the increase in the size can be suppressed by effectively utilizing the space.

Modifications

The embodiment can be changed and implemented as explained below. The embodiment and the following modification can be implemented in combination with each other within a technically consistent range.

Figure 8:
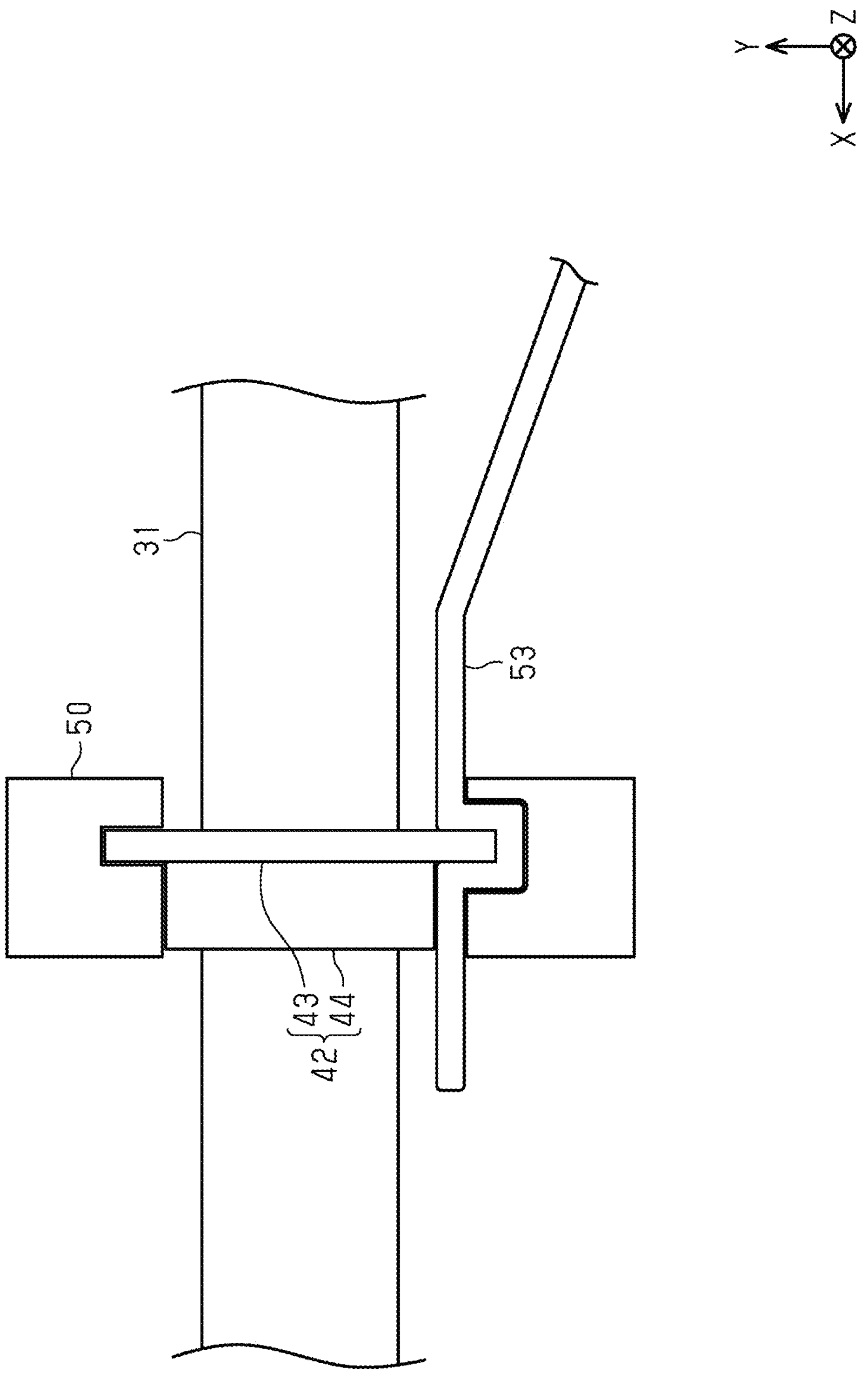
FIG. 8 is a schematic view of a grounding member in a modification.

As illustrated in FIG. 8, the grounding member 53 may be located between the flange section 43 and the holding section 50. The grounding member 53 may be in contact with the flange section 43 and the holding section 50. The grounding member 53 may be press-fit between the holding section 50 and the flange section 43 in a bent state. By press-fitting the grounding member 53, the grounding member 53 and the contact section 42 can be stably brought into contact with each other. By sandwiching the grounding member 53 between the flange section 43 and the holding section 50, the grounding member 53 can be stably brought into contact with the flange section 43. Since the grounding member 53 fills a gap of the contact section 42, rattling of the contact section 42 can be suppressed.

In an example illustrated in FIG. 8, the grounding member 53 is press-fit to extend in the X-axis direction but is not limited to this. That is, the grounding member 53 may be press-fit in the Z-axis direction. The grounding member 53 may be press-fit in a direction other than the X-axis direction and the Z-axis direction.

A member different from the path forming section 24 may include the holding section 50.

The holding section 50 may be provided on a surface other than the rear surface 24*b* if the holding section 50 is provided on the side opposite to the path surface 24*a* in the path forming section 24. For example, the holding section 50 may be provided on a surface along a YZ plane of the path forming section 24.

The bearing 40 may be provided on a surface other than the rear surface 24*b* if the bearing 40 is provided on a surface other than the path surface 24*a* in the path forming section 24.

The plurality of bearings 40 may be located on both sides of the rotating body 30 in the axial direction of the rotating shaft 31.

The holding section 50 may restrict the rotation of the contact section 42 by, for example, fitting a protrusion in a groove formed in the contact section 42. The holding section 50 may restrict the rotation of the contact section 42 with friction with the contact section 42. The holding section 50 may be fixed to the contact section 42. The holding section 50 may be bonded to the contact section 42 to restrict the rotation of the contact section 42.

The plane 48 may be located below the contact section 42. The plane 48 may be in contact with the rear surface 24*b* of the path forming section 24. The grounding member 53 may restrict the rotation of the contact section 42 by pressing the plane 48 of the contact section 42 against the rear surface 24*b* of the path forming section 24.

The plane 48 may be provided on the flange section 43. The holding section 50 may restrict the rotation of the flange section 43.

At least one of the ring section 44 and the flange section 43 may be an elliptical tube or a rectangular tube.

The rotating body 30 may be a roller that is driven to rotate. For example, at least one of the feeding roller 28, the retard roller 33, and the conveyance roller 36 may be a rotating body.

The rotating body 30 may be a roller that is driven to rotate with respect to the conveyed medium 15.

The rotating body 30 may be an endless belt that conveys the medium 15. The rotating shaft 31 may turn the belt.

The grounding member 53 may be in contact with the contact section 42 in a state of not being elastically deformed. The grounding member 53 may not urge the contact section 42. The grounding member 53 may be fixed to the contact section 42.

The path forming section 24 may be provided to be immovable.

The path forming section 24 may move to the open position and the closed position by sliding. The path forming section 24 may be detachably attachable to the main body.

The distal end of the holding section 50 may be located below the grounding member 53.

The contact section 42 may not include the flange section 43. The contact section 42 may not have the plane 48.

The holding section 50 may rotatably hold the contact section 42.

The bearing 40 may be provided separately from the path forming section 24.

The medium conveyance device 21 may not include the path forming section 24. The medium conveyance device 21 may convey the medium 15 by passing the medium 15 sandwiched between the conveyance roller 36 and the driven rotating body 37 to the next conveyance roller 36 and the driven rotating body 37.

The hole 45 may not be formed in the contact section 42. The contact section 42 may not surround the rotating shaft 31. For example, the contact section 42 may have a semi-circular shape.

The medium conveyance device 21 may convey the medium 15 to be printed. The rotating body 30 may be a roller that feeds the medium 15 to the printing unit 12. The rotating body 30 may be a roller that feeds the printed medium 15.

The medium conveyance device 21 may be a device that feeds the medium 15 printed by the printing apparatus 11 to a post-processing device that performs post-processing on the medium 15. The rotating body 30 may be a roller that feeds the medium 15 to a post-processing unit that performs the post-processing. The rotating body 30 may be a roller that feeds the medium 15 subjected to the post-processing.

The printing apparatus 11 is not limited to the inkjet printer and may be a laser printer, a thermal printer, a dot impact printer, a digital printing machine, or the like.

The printing apparatus 11 may be a liquid-jet apparatus that performs printing by jetting or ejecting liquid other than ink. States of the liquid ejected as a very small amount of droplets from the liquid-jet apparatus includes a particle, a tear drop, and a state in which a tail is drawn in a thread shape. Here, the liquid only has to be a material that can be jetted from the liquid-jet apparatus. For example, the liquid is only required to be in a liquid phase of a substance, and includes a liquid material high or low in viscosity, sol, gel water, other inorganic solvents, organic solvents, solutions, and a fluid material such as liquid resin, liquid metal, and metal melt. The liquid includes not only the liquid as a state of a substance, but also a liquid in which particles of a functional material made of a solid such as a pigment or a metal particle are dissolved, dispersed, or mixed in a solvent. Representative examples of the liquid include the ink and the liquid crystal as described in the above embodiments. Here, the term ink includes various types of liquid compositions such as general water-based ink, oil-based ink, gel ink, and hot melt ink. As a specific example of the liquid-jet apparatus, there is an apparatus that jets a liquid containing a material such as an electrode material or a coloring material used in, for example, manufacture of a liquid crystal display, an electroluminescence display, a surface-emitting display, and a color filter in a dispersed or dissolved form. The liquid-jet apparatus may be an apparatus that jets a bioorganic substance used for manufacturing a biochip, an apparatus that is used as a precision pipette and jets a liquid serving as a sample, a textile printing apparatus, a micro dispenser, or the like. The liquid-jet apparatus can be an apparatus that jets lubricating oil to a precision machine such as a timepiece or a camera in a pinpoint manner, or an apparatus that jets a transparent resin liquid such as ultra-violet curing resin onto a substrate in order to form a minute hemispherical lens, an optical lens, or the like used for an optical communication element or the like. The liquid-jet apparatus may be an apparatus that jets an etching liquid such as acid or alkali to etch a substrate or the like.

Definition

The expression "at least one" used in this specification means "one or more" of desired alternatives. For example, the expression "at least one" used in the present specification means "either one of alternatives" or "both of two alternatives" when the number of the alternatives is two. As another example, the expression "at least one" used in the present specification means "just one alternative", "a combination of any two alternatives" or "a combination of any three or more alternatives" when the number of the alternatives is three or more.

Appendices

In the following description, technical ideas understood from the embodiments and the modifications described above and operational effects thereof will be described.

(A) A medium conveyance device includes: a rotating body configured to rotate in contact with a medium; a conductive rotating shaft to which the rotating body is attached, the conductive rotating shaft rotating the rotating body; a bearing configured to rotatably hold the rotating shaft; a conductive contact section provided between the rotating body and the bearing in an axial direction of the rotating shaft and capable of coming into contact with the rotating shaft; and a grounding member configured to ground the contact section.

According to this configuration, the contact section is capable of coming into contact with the rotating shaft. The contact refers to a state in which one touches the other to come into contact with each other to be conductible. That is, the contact section is electrically coupled to the rotating shaft by touching the rotating shaft. The grounding member grounds the contact section. By grounding the rotating shaft with the contact section different from the bearing, it is possible to reduce design restrictions.

(B) In the medium conveyance device described in (A), a hole having a diameter larger than a diameter of the rotating shaft may be formed in the contact section.

For example, when the contact section deviates from the rotating shaft, the contact between the contact section and the rotating shaft is likely to be released. In this regard, the hole having the diameter larger than the diameter of the rotating shaft is formed in the contact section. That is, the rotating shaft can be inserted into the hole of the contact section. Therefore, the contact section and the rotating shaft can be stably brought into contact with each other.

(C) The medium conveyance device described in (A) or (B) may further include a path forming section configured to form a conveyance path on which the medium is conveyed, the path forming section may include a path surface that forms the conveyance path, and the contact section may be provided on a side opposite to the path surface with respect to the path forming section.

With this configuration, the contact section is provided on the side opposite to the path surface with respect to the path forming section. By effectively utilizing a space formed by providing the path forming section, it is possible to suppress an increase in size of the device.

(D) In the medium conveyance device described in (C), the bearing may be provided on a rear surface of the path forming section on a side opposite to the path surface, and the path forming section may be non-conductive.

With this configuration, the bearing is provided on the rear surface of the path forming section. The rear surface is a surface on the side opposite to the path surface. By effectively utilizing the space formed by providing the path forming section, it is possible to suppress the increase in the size of the device.

(E) In the medium conveyance device described in (C) or (D), the contact section may include: a ring section in which a hole having a diameter larger than the diameter of the rotating shaft is formed; and a flange section protruding from the ring section in a radial direction of the hole, and the path forming section may include a holding section that holds the flange section.

With this configuration, the contact section includes the ring section and the flange section. The diameter of the hole formed in the ring section is larger than the diameter of the rotating shaft. For that reason, the contact section becomes capable of moving in the axial direction with respect to the rotating shaft inserted into the hole. In this regard, the path forming section includes the holding section. The holding section holds the flange section. Therefore, it is possible to restrict movement of the contact section in the axial direction.

(F) In the medium conveyance device described in (E), the holding section may hold the contact section to be incapable of rotating.

For example, when the contact section rotates, noise is likely to occur. In this regard, with this configuration, the holding section holds the contact section to be incapable of rotating. For that reason, it is possible to suppress occurrence of noise involved in the rotation of the contact section.

(G) In the medium conveyance device described in (F), an outer circumferential surface of the ring section may include a columnar surface and a plane, and the holding section may include a stopper that comes into contact with the plane.

For example, when the stopper is brought into contact with the columnar surface to disable the rotation of the contact section with a frictional force, the stopper needs to be pressed against the columnar surface with a large force. In this regard, with this configuration, the stopper comes into contact with the plane. For that reason, the contact section can be easily disabled to rotate.

(H) In the medium conveyance device described in (F) or (G), the grounding member may be located between the flange section and the holding section and may be in contact with the flange section and the holding section.

With this configuration, the grounding member is located between the flange section and the holding section. By sandwiching the grounding member between the flange section and the holding section, it is possible to stably bring the grounding member into contact with the flange section.

(I) In the medium conveyance device described in (C) to (H), the grounding member may have elasticity and urge the contact section toward the rotating shaft, the path forming section may include a holding section that holds the contact section, and the holding section may hold the contact section to be displaceable in an urging direction in which the grounding member urges the contact section.

With this configuration, the grounding member urges the displaceable contact section toward the rotating shaft. For that reason, it is possible to stably bring the grounding member and the contact section and the contact section and the rotating shaft into contact with each other.

(J) In the medium conveyance device described in (I), the holding section may extend further in a direction opposite to the urging direction than the grounding member.

With this configuration, the holding section extends further in the direction opposite to the urging direction than the grounding member. For that reason, it is possible to reduce the likelihood that the contact section urged in the urging direction by the grounding member comes off from the holding section.

(K) In the medium conveyance device described (A) to (J), the bearing may be provided in the path forming section, the path forming section may be capable of moving to a closed position where the conveyance path is formed and an open position where the path surface is exposed, and the grounding member may ground the contact section in a state in which the path forming section is located at the closed position.

According to this configuration, the path forming section is capable of moving. The bearing is provided in the path forming section. For that reason, the rotating shaft held by the bearing moves together with the path forming section. The structure for grounding the moving rotating shaft cannot be fixed. The grounding member grounds the contact section in a state in which the path forming section forms the conveyance path. Therefore, it is possible to reduce the influence of the charged rotating body on the medium on the conveyance path.

(L) In the medium conveyance device described in (A) to (G), the grounding member may have elasticity and urge the contact section toward the rotating shaft.

With this configuration, the grounding member urges the contact section toward the rotating shaft. That is, the grounding member presses the contact section against the rotating shaft. Therefore, it is possible to stably bring the grounding member, the contact section, and the rotating shaft into contact with one another.

(M) In the medium conveyance device described in (A) to (L), the rotating body may be a separation roller that separates a stacked plurality of media and may be attachable to and detachable from the rotating shaft from a side opposite to the contact section.

For example, when the separation roller deteriorates, the medium is likely to be conveyed while being kept stacked. In this respect, with this configuration, the rotating body, which is the separation roller, is detachably attachable from the side opposite to the contact section. For that reason, it is possible easily replace the rotating body while the contact section is kept in contact with the rotating shaft.

(N) The medium conveyance device described in (A) to (M) may further include: a driven rotating body configured to rotate following the conveyed medium; a conductive support shaft configured to rotatably support the driven rotating body; and a conductive member configured to conduct the support shaft and the contact section.

With this configuration, the conductive member conducts the support shaft and the contact section. That is, the driven rotating body is grounded via the support shaft, the conductive member, the contact section, and the grounding member. Therefore, structure can be simplified compared with a case in which a mechanism for grounding the rotating body and a mechanism for grounding the driven rotating body are respectively provided.

(O) An image reading device includes: a medium conveyance device including: a rotating body configured to rotate in contact with a medium; a conductive rotating shaft to which the rotating body is attached, the conductive rotating shaft rotating the rotating body; a bearing configured to rotatably hold the rotating shaft; a conductive contact section provided between the rotating body and the bearing in an axial direction of the rotating shaft and capable of coming into contact with the rotating shaft; and a grounding member configured to ground the contact section; and a reading unit configured to read an image of the medium conveyed by the medium conveyance device.

With this configuration, it is possible to achieve the same effects as the effects of the medium conveyance device.

(P) A printing apparatus includes: the image reading device described in (O); and a printing unit configured to print the image read by the image reading device.

With this configuration, it is possible to achieve the same effects as the effects of the medium conveyance device.

What is claimed is:

1. A medium conveyance device comprising:

a rotating body configured to rotate in contact with a medium;

a conductive rotating shaft to which the rotating body is attached, the conductive rotating shaft rotating the rotating body;

a bearing configured to rotatably hold the conductive rotating shaft;

a conductive contact section provided between the rotating body and the bearing in an axial direction of the conductive rotating shaft and capable of coming into contact with the conductive rotating shaft;

a grounding member configured to ground the conductive contact section; and a path forming section configured to form a conveyance path on which the medium is conveyed, wherein the path forming section includes a path surface that forms the conveyance path, the conductive contact section is provided on a side opposite to the path surface with respect to the path forming section, the bearing is provided on a rear surface of the path forming section on the side opposite to the path surface, and the path forming section is non-conductive.

2. The medium conveyance device according to claim 1, wherein a hole having a diameter larger than a diameter of the conductive rotating shaft is formed in the conductive contact section.

3. The medium conveyance device according to claim 1, wherein the conductive contact section includes:

a ring section in which a hole having a diameter larger than a diameter of the conductive rotating shaft is formed; and a flange section protruding from the ring section in a radial direction of the hole, and the path forming section includes a holding section that holds the flange section.

4. The medium conveyance device according to claim 3, wherein the holding section holds the conductive contact section to be incapable of rotating.

5. The medium conveyance device according to claim 4, wherein an outer circumferential surface of the ring section includes a columnar surface and a plane, and the holding section includes a stopper that comes into contact with the plane.

6. The medium conveyance device according to claim 4, wherein the grounding member is located between the flange section and the holding section and is in contact with the flange section and the holding section.

7. The medium conveyance device according to claim 1, wherein the grounding member has elasticity and urges the conductive contact section toward the conductive rotating shaft, the path forming section includes a holding section that holds the conductive contact section, and the holding section holds the conductive contact section to be displaceable in an urging direction in which the grounding member urges the conductive contact section.

8. The medium conveyance device according to claim 7, wherein the holding section extends further in a direction opposite to the urging direction than the grounding member.

9. The medium conveyance device according to claim 1, wherein the bearing is provided on or in the path forming section, the path forming section is capable of moving to a closed position where the conveyance path is formed and an open position where the path surface is exposed, and the grounding member grounds the conductive contact section in a state in which the path forming section is located at the closed position.

10. The medium conveyance device according to claim 1, wherein the grounding member has elasticity and urges the conductive contact section toward the conductive rotating shaft.

11. The medium conveyance device according to claim 1, wherein the rotating body is a separation roller that separates a stacked plurality of media and is attachable to and detachable from the conductive rotating shaft from a side opposite to the conductive contact section.

12. The medium conveyance device according to claim 1, further comprising:

a driven rotating body configured to rotate following the conveyed medium;

a conductive support shaft configured to rotatably support the driven rotating body; and a conductive member configured to conduct the conductive support shaft and the conductive contact section.

13. An image reading device comprising:

a medium conveyance device including:

a rotating body configured to rotate in contact with a medium;

a conductive rotating shaft to which the rotating body is attached, the conductive rotating shaft rotating the rotating body;

a bearing configured to rotatably hold the conductive rotating shaft;

a conductive contact section provided between the rotating body and the bearing in an axial direction of the conductive rotating shaft and capable of coming into contact with the conductive rotating shaft;

a grounding member configured to ground the conductive contact section; and a path forming section configured to form a conveyance path on which the medium is conveyed, wherein the path forming section includes a path surface that forms the conveyance path, the conductive contact section is provided on a side opposite to the path surface with respect to the path forming section, the bearing is provided on a rear surface of the path forming section on the side opposite to the path surface, and the path forming section is non-conductive; and a reading unit configured to read an image of the medium conveyed by the medium conveyance device.

14. A printing apparatus comprising:

the image reading device according to claim 13; and a printing unit configured to print the image read by the image reading device.

15. A medium conveyance device comprising:

a rotating body configured to rotate in contact with a medium;

a conductive rotating shaft to which the rotating body is attached, the conductive rotating shaft rotating the rotating body;

a bearing configured to rotatably hold the conductive rotating shaft;

a conductive contact section provided between the rotating body and the bearing in an axial direction of the conductive rotating shaft and capable of coming into contact with the conductive rotating shaft;

a grounding member configured to ground the conductive contact section;

a driven rotating body configured to rotate following the medium;

a conductive support shaft configured to rotatably support the driven rotating body; and a conductive member configured to conduct the conductive support shaft and the conductive contact section.

16. A medium conveyance device comprising:

a rotating body configured to rotate in contact with a medium;

a conductive rotating shaft to which the rotating body is attached, the conductive rotating shaft rotating the rotating body;

a bearing configured to rotatably hold the conductive rotating shaft;

a conductive contact section provided between the rotating body and the bearing in an axial direction of the conductive rotating shaft and capable of coming into contact with the conductive rotating shaft; and a grounding member configured to ground the conductive contact section, wherein the grounding member is in direct contact with the conductive contact section.

17. The medium conveyance device according to claim 16, wherein the conductive rotating shaft is electrically coupled to the grounding member via the conductive contact section.

18. The medium conveyance device according to claim 17, wherein the bearing is attached to a non-conductive member.

19. The medium conveyance device according to claim 16, further comprising:

a frame body attached on a first side of the rotating body opposite to a second side on which the conductive contact section is located, wherein the frame body is detachable from the conductive rotating shaft.

* * * * *